United States Patent

Kraut

[11] Patent Number: 5,586,640
[45] Date of Patent: Dec. 24, 1996

[54] CONVEYOR CHAIN

[75] Inventor: Ingolf Kraut, Balingen, Germany

[73] Assignee: Bizerba-Werkr Wilhelm Kraut GmbH & Co. KG, Balingen, Germany

[21] Appl. No.: 428,089

[22] PCT Filed: Nov. 12, 1993

[86] PCT No.: PCT/EP93/03181

§ 371 Date: Jul. 6, 1995

§ 102(e) Date: Jul. 6, 1995

[87] PCT Pub. No.: WO94/11279

PCT Pub. Date: May 26, 1994

[30] Foreign Application Priority Data

Nov. 13, 1992 [DE] Germany ............................ 9215323 U

[51] Int. Cl.$^6$ .................................................. B65G 15/42
[52] U.S. Cl. ............................................ 198/692; 198/853
[58] Field of Search ................................ 198/692, 693, 198/850, 853

[56] References Cited

U.S. PATENT DOCUMENTS

| | | | |
|---|---|---|---|
| 180,253 | 7/1876 | McFadden | 198/692 |
| 2,070,362 | 2/1937 | Kreutz. | |
| 2,426,794 | 9/1947 | Sjostrom | 198/692 |
| 2,977,266 | 3/1961 | Sedgley | 198/692 |
| 4,216,690 | 8/1980 | Bullock | 83/114 |
| 5,065,860 | 11/1991 | Faulkner | 198/853 X |

FOREIGN PATENT DOCUMENTS

| | | | |
|---|---|---|---|
| 515628 | 4/1921 | France. | |
| 564159 | 12/1923 | France. | |
| 848028 | 9/1952 | Germany | 81/17 |
| 7005417 | 6/1970 | Germany. | |
| 9103801 | 10/1991 | Germany. | |
| 408871 | 11/1973 | U.S.S.R. | B65G 17/40 |

*Primary Examiner*—James R. Bidwell
*Attorney, Agent, or Firm*—Shenier & O'Connor

[57] ABSTRACT

A chain for conveying slices of a food product comprises a series of interlocking U shaped links each having a crossbar and two legs. The legs are provided with loops which partially surround the crossbar of an adjacent link. Some of the loops have an endpiece which is bent through at least 270° and is provided with an elongated tip which extends appreciably from and at substantially right angles to the plane of the chain. These tips penetrate the slices and ensure that they are carried by the chain without slippage. Preferably each endpiece having a tip is adjacent the outer portion of a leg so that the mechanism for lifting the slice from the chain can operate in the closest possible proximity to the tip in order to reduce bending of the slice.

17 Claims, 2 Drawing Sheets

K = short
S = tip

CONVEYOR CHAIN

The invention relates to a conveyor chain for the conveying device of a slice depositing device on a slicing machine for sausage, meat, cheese or the like, comprising chain links which are formed in one piece from wire together with tips projecting vertically from the belt chain and receiving slices of the cut product, wherein the chain links each have a U-shaped central part designed symmetrically to the longitudinal direction of the chain and having a crossbar and two legs adjoining the crossbar on opposite sides thereof, these legs bearing loops integrally formed at their free ends.

BACKGROUND OF THE INVENTION

Semiautomatic or fully automatic slicing machines of this type are provided essentially with a rotating circular cutter blade, a reciprocating feed carriage receiving the product to be cut, a depositing device for the cut slices, consisting of a deflecting, a conveying and a knock-off device, as well as a movable stacking table (cf., e.g., DE-AS 19 6 069 and DE-PS 17 57 766).

The slices of the product which are cut off by the circular cutter blade are taken over onto the conveying device by means of the deflecting device, the conveying device being provided with a plurality of tensioned, belt-like conveyor chains which are equipped with needle-like tips, are parallel to one another and extend around two axes of deflection in horizontal direction in a chain frame.

The conveying device brings the slices of the cut product from the take-over position into the deposit position in a controlled movement and withdraws them from the tips in a circular, stopped movement with the aid of a rake-like knock-off device dipping between the conveyor chains in a rest position and deposits them on the table in a stacked or shingle-type arrangement in rows or over the entire surface (cf., e.g., DE-GM 77 04 685 and DE-PS 27 07 534).

Conveyor chains of the type described are known per se. They consist of a certain number of chain links bent out of nonrusting wire and connected together by bent loops, wherein these links are provided at specific intervals with entraining tips projecting vertically to the direction of conveyance, the cut product to be conveyed being speared on these tips and taken along to the place of deposit.

In the case of conveyor chains which have been in practical use for many years, the entraining tips are welded centrally onto the straight crossbars of the individual chain links vertically to the direction of conveyance.

This construction does, however, have the disadvantage that the welding process is complicated, necessitates a subsequent, chemical treatment of the surfaces and can lead to thermal stresses and undesired structural changes at the point of welding so that when subject to continuous stressing individual entraining tips can become detached or break off and remain in the cut product which can lead to injuries.

To avoid these disadvantages, a further development of this embodiment has, in the meantime, provided for the use of integral chain links which are known per se and are formed from a single piece of wire. A prior, known proposal along these lines (cf., e.g., DE-GM 91 03 801.4) does, however, have the disadvantage that it would be problematic from the point of view of production or bending technology, i.e. could be realized only with considerable tool resources, and has not so far led to any acceptable practical results with respect to its use.

The object underlying the invention is to avoid the disadvantages described and to propose chain links or conveyor chains which are satisfactory from the point of view of production and use, can be manufactured inexpensively and, in particular, treat the cut product with care.

The advantages achieved hereby will be explained at the end of the description of the embodiments for the sake of better understanding.

BRIEF DESCRIPTION OF THE DRAWINGS

One embodiment of the invention is illustrated in the drawings and described in more detail in the following. In the drawings.

DESCRIPTION OF THE PREFERRED EMBODIMENT

Figures 1, 3:
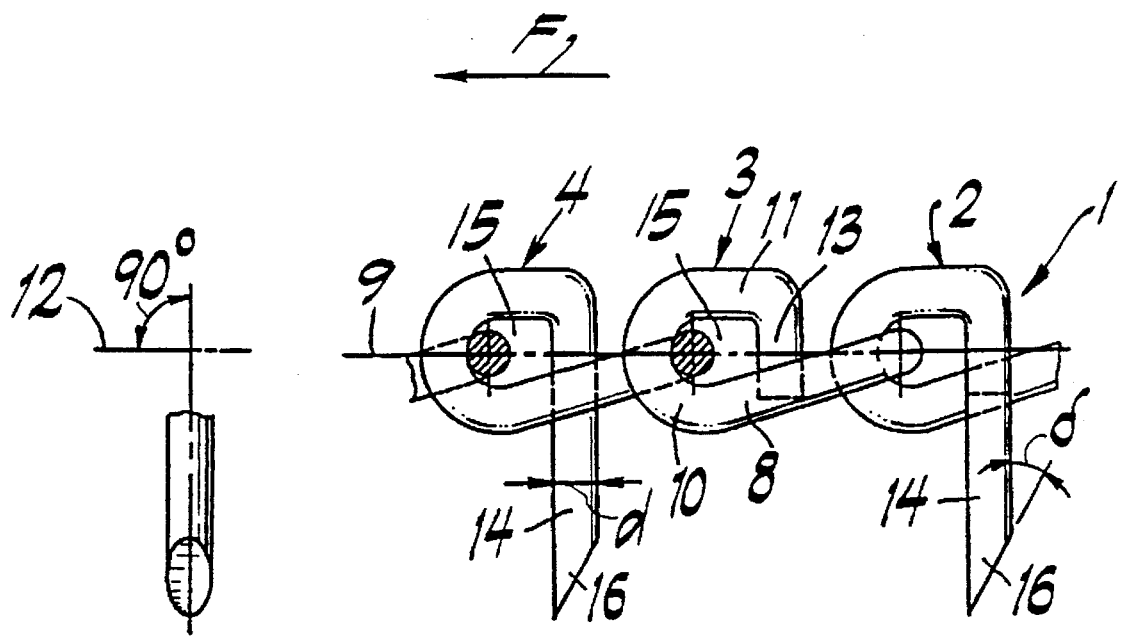
FIG. 1 is a plan view of the conveyor chain illustrated in section and comprising 3 chain links.
FIG. 3 shows the tip of a chain link of the conveyor chain seen in the direction of conveyance F.
Figure 2:
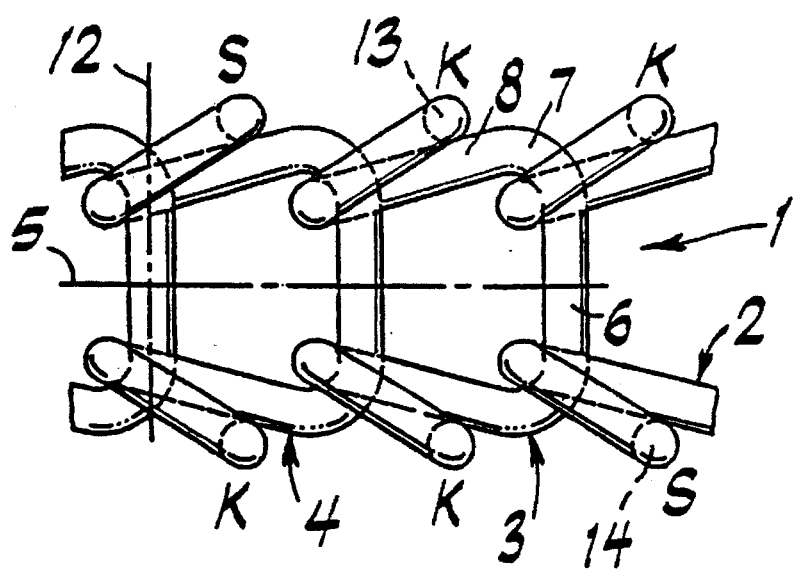
FIG. 2 is a side view of the conveyor chain according to FIG. 1.

The conveyor chain 1 illustrated in section in the plan and side views in FIGS. 1 and 2 consists of the chain links 2, 3 and 4, which are bent in one piece out of stainless steel wire, whereby the belt chain 1 consisting of the individual chain links is produced in a so-called follow-on tool in a subdivided operating step.

The chain links 2, 3 or 4 are made up—symmetrically to a central axis 5 parallel to the direction of conveyance F—of a U-shaped central part consisting of a straight central crossbar 6 with straight legs 8 each inclined conically inwards via a curved part 7, whereby the inside width between the legs 8 is 2.3 to 2.7, preferably 2.5 × the diameter d of the wire and the internal radius of the curved part 7 is 0.6 to 0.8×d, preferably 0.75×d.

A loop 15 is bent onto each of the two legs 8 and this consists of a curved part 10 which is approximately semicircular in shape and has an internal radius of 0.65 to 0.85, preferably 0.75×d, and a straight part 11 parallel to the longitudinal axis 9 as well as a straight endpiece 13, 14 which is adjoined thereto and is bent (in FIG. 1 oriented downwards) at right angles to the longitudinal axis 9 and to the axis 12 of the crossbar 6 (FIGS. 2 and 3). The endpieces each abut externally on the leg 8 and therefore close the loop 15. The endpieces 13, 14 are provided alternatively with short, blunt ends having a total length of 2.5 to 2.9, preferably of 2.7×d, which therefore projects into the plane of the central part 6, 7, 8, or with integrally formed tips 16 having a total length overall of 7.5 to 7.9, preferably 7.7×d.

The endpieces 14 with tips 16 are bevel-cut at an angle δ of 25° to 35°, preferably 30°, and form tips 16 which are located forwards when seen in the direction of conveyance F and which take up the cut slices of the product and move them along.

The tips 16 can also be stamped in a conical shape as well as with one or more surfaces.

Figure 4:
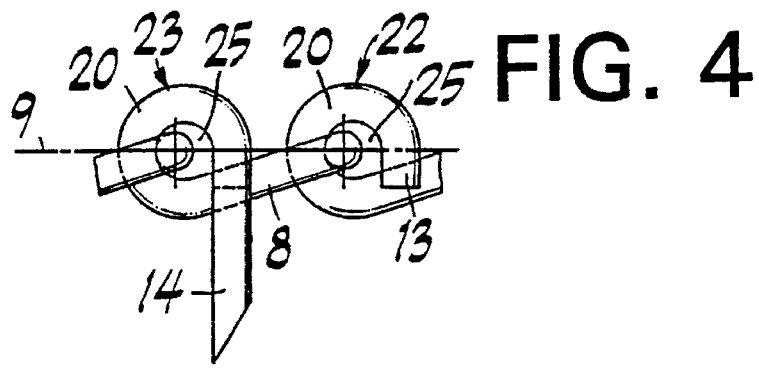
FIG. 4 is the plan view of a variation of the conveyor chain.
Figure 5:
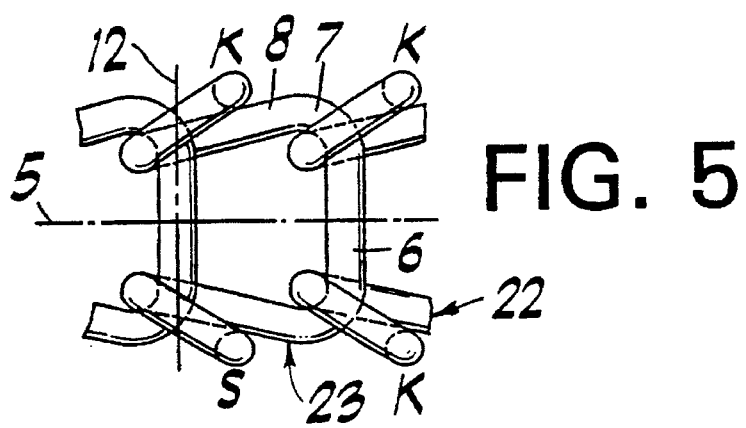
FIG. 5 is a side view of the conveyor chain according to FIG. 4.

FIGS. 4 and 5 show as one variation of the embodiment chain links 22 and 23, with which a loop 25 adjoins the U-shaped central part 6, 7, 8 each time and consists of a curved part 20 in the shape of three-quarters of a circle and having an internal radius of 0.65 to 0.8×d, preferably 0.75d, as well as a respective, straight endpiece 13 and/or 14 which is adjoined thereto and arranged at right angles to the longitudinal axis 9 and to the crossbar axis 12 (or at right angles to the plane of the conveyor chain), whereby the endpieces each abut externally on the straight leg 8 and close the loop 25.

Figure 6:
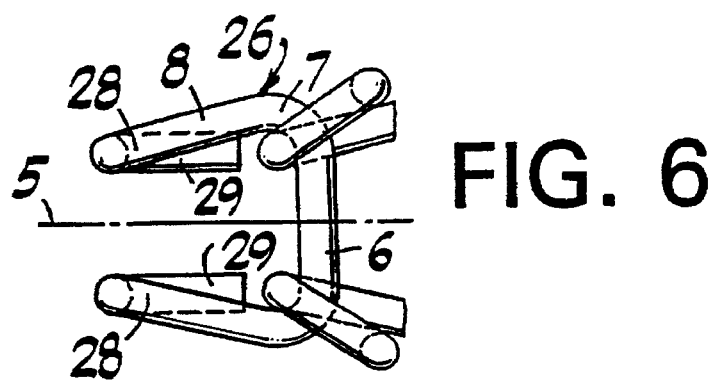
FIG. 6 is a plan view of the end link of the conveyor chain.
Figure 7:
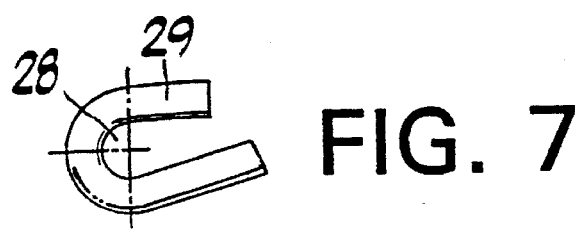
FIG. 7 is the side view of the loop hook of the end link according to FIG. 6.

FIG. 6 shows in the side view an advantageous design of a chain end link 26 of the inventive belt chain 1, with which an open loop 28 with a returning section 29 adjoins each of the straight legs 8 of the central part 6, 7, 8. The length of this section 29 is overall 3.5 to 4.2×d, preferably 4×d (FIG. 7). The first link of the belt chain 1 is attached to the loops 28 of the end link 26 and the closed form thus produced.

The arrangement according to FIGS. 1 and 2 shows a particularly advantageous arrangement of short endpieces 13 and long endpieces 14 with tips 16 which can be used universally and has been optimized through practical tests, whereby two chain links 2 and 4 having long endpieces 14 with tips 16 arranged alternately, i.e., according to FIG. 2 one at the top and one at the bottom, and one chain link 13 having two short endpieces 13 arranged therebetween are coupled with one another each time.

Other arrangements have, however, been tested for special uses, whereby the chain links 2 and 4, for example, each have two long endpieces 14 with tips 16 or all the chain links 2, 3, 4 et seq. have only long endpieces 14 with tips. Arrangements are also possible, as an additional example, where at least two chain links 3 are arranged between two chain links 2 and 4. Other arrangement combinations are also conceivable, depending on their use and in adaptation to the respective characteristics of the product to be cut.

The inventive design and arrangement of the chain links of the conveyor chain, which have been determined in lengthy series of tests, result in the following essential advantages in comparison with the known state of the art.

The alternating position of the tips at the edge of the belt chain means that the slices of the cut product are received on more rows of tips over a greater area and therefore in a more even and careful manner, which is also favorable, in particular, for products having a flat, rectangular cross section, such as, e.g., streaky bacon.

When the slices are lifted from the entraining pins by the knock-off device, the deformation of the slices in the vicinity of the pins is reduced to a minimum since, due to the arrangement of the pins at the outer edge of the belt chain instead of in the center, the knock-off device can engage on the slices in the direct vicinity of these pins.

An essential rationalizing effect results in that, due to the alternating pin arrangement on the conveying device, one to two of a previous eight belt chains can be dispensed with.

Accordingly, fewer deflecting rollers and tension springs for tensioning the belt chains are necessary and likewise fewer striking bars on the knock-off device.

In addition, the cut product is, as a whole, perforated to a lesser extent by the smaller number of pins.

The entire conveyor chain is advantageously produced in consecutive partial operating steps in a single, so-called follow-on tool, i.e. all the individual chain links, including the end link, are formed and joined to one another in one operation so that the completely finished belt chain comes out of the tool or the machine in a desired length.

I claim:

1. A chain for conveying slices of a food product including in combination a plurality of interlocking links formed of wire, each link having a U shape and comprising a crossbar and two legs, each leg being bent from the crossbar by more than 90° whereby the legs are inclined toward one another, the legs terminating in loops having endpieces which are bent through at least 180° and at least partially surround the crossbar of an adjacent link, a predetermined number of links having at least one loop the endpiece of which is bent through at least 270° and comprises an elongated tip extending appreciably from and at substantially right angles to the plane of the chain.

2. Conveyor chain as defined in claim 1, characterized in that the crossbar (6) and the legs (8) are essentially straight.

3. Conveyor chain as defined in claim 1, characterized in that the endpieces (13, 14) abut externally on the legs (8).

4. Conveyor chain as defined in claim 1, characterized in that the endpieces (13, 14) are essentially straight.

5. Conveyor chain as defined in claims 1, characterized in that the loops (15) comprise a curved part in the shape of particular a, in particular a semicircle, and an essentially straight part parallel to the longitudinal axis of the chain.

6. Conveyor chain as defined in claim 1, characterized in that with the chain links (22, 23) a loop (25) adjoins each leg (8) of the U-shaped central part (6, 7, 8), said loop consisting of a curved part (20) in the shape of three-quarters of a circle as well as a straight endpiece (13, 14) adjoining said curved part and arranged at right angles to the plane of the chain belt, said endpiece abutting in each instance externally on the straight leg (8) and closing the loop (25).

7. Conveyor chain as defined in claim 1, characterized in that with the chain links (2, 3, 4, 22, 23) the inside width between the legs (8) of the U-shaped central part (6, 7, 8) is 2.3 to 2.8 × the diameter d of the wire and the internal radius of the curved part (7) is 0.6 to 0.8d, the curved parts (10; 20) in the form of a partial circle have an internal radius of 0.65 to 0.85×d and the total length of the endpieces (13) is 2.5 to 2.9×d, that of the endpieces (14) including the tips (16) is 7.5 to 7.9×d overall.

8. Conveyor chain as defined in claims 1, characterized in that with the chain links (2, 3, 4, 22, 23) the inside width between the legs (8) of the U-shaped central part (6, 7, 8) is 2.5×the diameter d of the wire and the curved part (7) as well as the curved parts (10, 20) in the shape of a partial circle have an internal radius of 0.75×d and the total length of the endpieces (13) is 2.7×d, that of the endpieces including the tips (16) is 7.7×d overall.

9. Conveyor chain as defined in claim 1, characterized in that the tips (16) are formed by a bevel cut at an angle δ of 25° to 35°.

10. Conveyor chain as defined in claim 9, characterized in that the angle δ is 30°.

11. Conveyor chain as defined in claim 1, characterized in that the tips (16) are stamped in a conical shape as well as with one or more surfaces.

12. Conveyor chain as defined in claim 1, characterized in that two chain links (2 and 4) with alternately arranged endpieces (14) with tips (16) and one chain link (3) with endpieces (13) without tips are coupled to one another each time.

13. Conveyor chain as defined in claim 1, characterized in that chain links bearing tips (16) on both endpieces are present and that these chain links are connected with one another by at least one chain link without tips.

14. Conveyor chain as defined in claim 1, characterized in that all the chain links (2, 3, 4, 22, 23) have alternately endpieces (14) with tips (16).

15. Conveyor chain as defined in claim 1, characterized in that all the chain links (2, 3, 4, 22, 23) are equipped with endpieces (14) with tips (16).

16. Conveyor chain as defined in claim 1, characterized in that the belt chain comprises a chain end link (26) consisting of the U-shaped central part (6, 7, 8) and legs (8) adjoining said central part, said legs each having an open loop (28) and a returning section (29) with a length overall of 3.5 to 4.2×d.

17. Conveyor chain as defined in claim 16, characterized in that the returning section (29) of the open loop (28) has a length overall of 4.0×d.

* * * * *

UNITED STATES PATENT AND TRADEMARK OFFICE
CERTIFICATE OF CORRECTION

PATENT NO. : 5,586,640
DATED : December 24, 1996
INVENTOR(S) : Ingolf Kraut

It is certified that error appears in the above-indentified patent and that said Letters Patent is hereby corrected as shown below:

Claim 5, line 1 - delete "s" from word "claim".

line 3 - delete "particular a, in particular".

Claim 8, line 1 - delete "s" from word "claim".

Signed and Sealed this

Eighteenth Day of March, 1997

*Attest:*

BRUCE LEHMAN

*Attesting Officer*     *Commissioner of Patents and Trademarks*